(12) United States Patent
Skinner et al.

(10) Patent No.: US 8,723,454 B2
(45) Date of Patent: May 13, 2014

(54) MOTOR ARRANGEMENT FOR WINDOW COVERINGS

(75) Inventors: Gary Skinner, Broomfield, CO (US); Richard Langille, Lafayette, CO (US); Philip Chermak, Lafayette, CO (US)

(73) Assignee: Hunter Douglas Inc., Pearl River, NY (US)

( * ) Notice: Subject to any disclaimer, the term of this patent is extended or adjusted under 35 U.S.C. 154(b) by 488 days.

(21) Appl. No.: 13/054,359

(22) PCT Filed: Jul. 22, 2009
(Under 37 CFR 1.47)

(86) PCT No.: PCT/US2009/051405
§ 371 (c)(1),
(2), (4) Date: Jun. 15, 2011

(87) PCT Pub. No.: WO2010/011751
PCT Pub. Date: Jan. 28, 2010

(65) Prior Publication Data
US 2011/0265958 A1    Nov. 3, 2011

Related U.S. Application Data

(63) Continuation-in-part of application No. 12/177,330, filed on Jul. 22, 2008, now Pat. No. 8,193,742.

(51) Int. Cl.
*H02P 1/54* (2006.01)
*H02P 5/00* (2006.01)
*H02P 5/46* (2006.01)

(52) U.S. Cl.
USPC .............. 318/34; 318/16; 318/280; 318/282

(58) Field of Classification Search
USPC .......... 318/34, 16, 280, 282; 160/84.01, 130, 160/133, 168.1
See application file for complete search history.

(56) References Cited

U.S. PATENT DOCUMENTS

| | | |
|---|---|---|
| 1,733,176 A | 10/1929 | Winter |
| 2,124,037 A | 7/1938 | Lavigne |
| 3,030,535 A | 4/1962 | Weisner |
| 3,308,873 A | 3/1967 | Dotto |
| 3,310,099 A | 3/1967 | Hunter et al. |
| 3,340,835 A | 9/1967 | Cook et al. |
| 3,451,639 A | 6/1969 | Atwood et al. |
| 3,459,978 A | 8/1969 | Trucks et al. |
| 3,809,143 A | 5/1974 | Ipekgil |
| 4,159,162 A | 6/1979 | Christoffel |

(Continued)

FOREIGN PATENT DOCUMENTS

| | | |
|---|---|---|
| WO | WO 01/77479 A2 | 10/2001 |
| WO | WO 2005/085578 A2 | 9/2005 |
| WO | WO 2005/090736 A1 | 9/2005 |
| WO | WO 2006/0046103 A1 | 5/2006 |

*Primary Examiner* — Erick Glass
(74) *Attorney, Agent, or Firm* — Dorsey & Whitney LLP

(57) ABSTRACT

The present invention relates to an architectural window covering having a programmable electric motor. The programmable electric motor is housed within a roller for raising and lowering the window covering, and includes dual stacked motors and light-transmitting control actuation buttons In one embodiment an architectural window covering, composing a shade, a roller defining a bore coupled to the shade, and at least two motors axially aligned and electrically coupled in parallel and positioned at least partially in said bore and rotatably coupled to the roller is disclosed.

20 Claims, 11 Drawing Sheets

(56) References Cited

U.S. PATENT DOCUMENTS

| | | |
|---|---|---|
| 4,471,248 A | 9/1984 | Smetana |
| 4,623,812 A | 11/1986 | van de Griend |
| 4,663,575 A | 5/1987 | Juzswik et al. |
| 4,827,199 A | 5/1989 | Kaucic et al. |
| 4,843,297 A | 6/1989 | Landino et al. |
| 4,878,528 A | 11/1989 | Kobayashi |
| 4,885,948 A | 12/1989 | Thrasher, Jr. et al. |
| 5,010,940 A | 4/1991 | Marocco |
| 5,274,499 A | 12/1993 | Shopp |
| 5,467,266 A | 11/1995 | Jacobs et al. |
| 5,495,153 A * | 2/1996 | Domel et al. ............ 318/17 |
| 5,515,898 A | 5/1996 | Alcocer |
| 5,517,094 A | 5/1996 | Domel et al. |
| 5,671,387 A | 9/1997 | Jacobs et al. |
| 5,760,558 A | 6/1998 | Popat |
| 5,772,274 A | 6/1998 | Tokarz |
| 5,793,174 A | 8/1998 | Kovach et al. |
| 6,064,165 A | 5/2000 | Boisvert et al. |
| 6,111,694 A | 8/2000 | Shopp |
| 6,328,274 B1 | 12/2001 | Hayashi |
| 6,487,267 B1 | 11/2002 | Wolter |
| 6,630,758 B2 | 10/2003 | Aoki et al. |
| 6,759,817 B2 | 7/2004 | Mersch |
| 6,979,962 B2 | 12/2005 | Cavarec et al. |
| 7,389,806 B2 | 6/2008 | Kates |
| 7,407,040 B2 | 8/2008 | Doran |
| 7,723,939 B2 | 5/2010 | Carmen, Jr. |
| 8,193,742 B2 | 6/2012 | Skinner et al. |
| 8,307,878 B2 | 11/2012 | Faller et al. |
| 8,461,784 B2 | 6/2013 | Skinner et al. |
| 2001/0050538 A1 | 12/2001 | Kovach et al. |
| 2002/0190678 A1 | 12/2002 | Huber et al. |
| 2007/0191126 A1 | 8/2007 | Mandracken |
| 2008/0044790 A1 | 2/2008 | Fani et al. |
| 2009/0059574 A1 | 3/2009 | Lewis et al. |
| 2010/0018654 A1 | 1/2010 | Skinner et al. |
| 2010/0175838 A1 | 7/2010 | Faller et al. |
| 2012/0234504 A1 | 9/2012 | Skinner et al. |
| 2013/0068404 A1 | 3/2013 | Faller et al. |

* cited by examiner

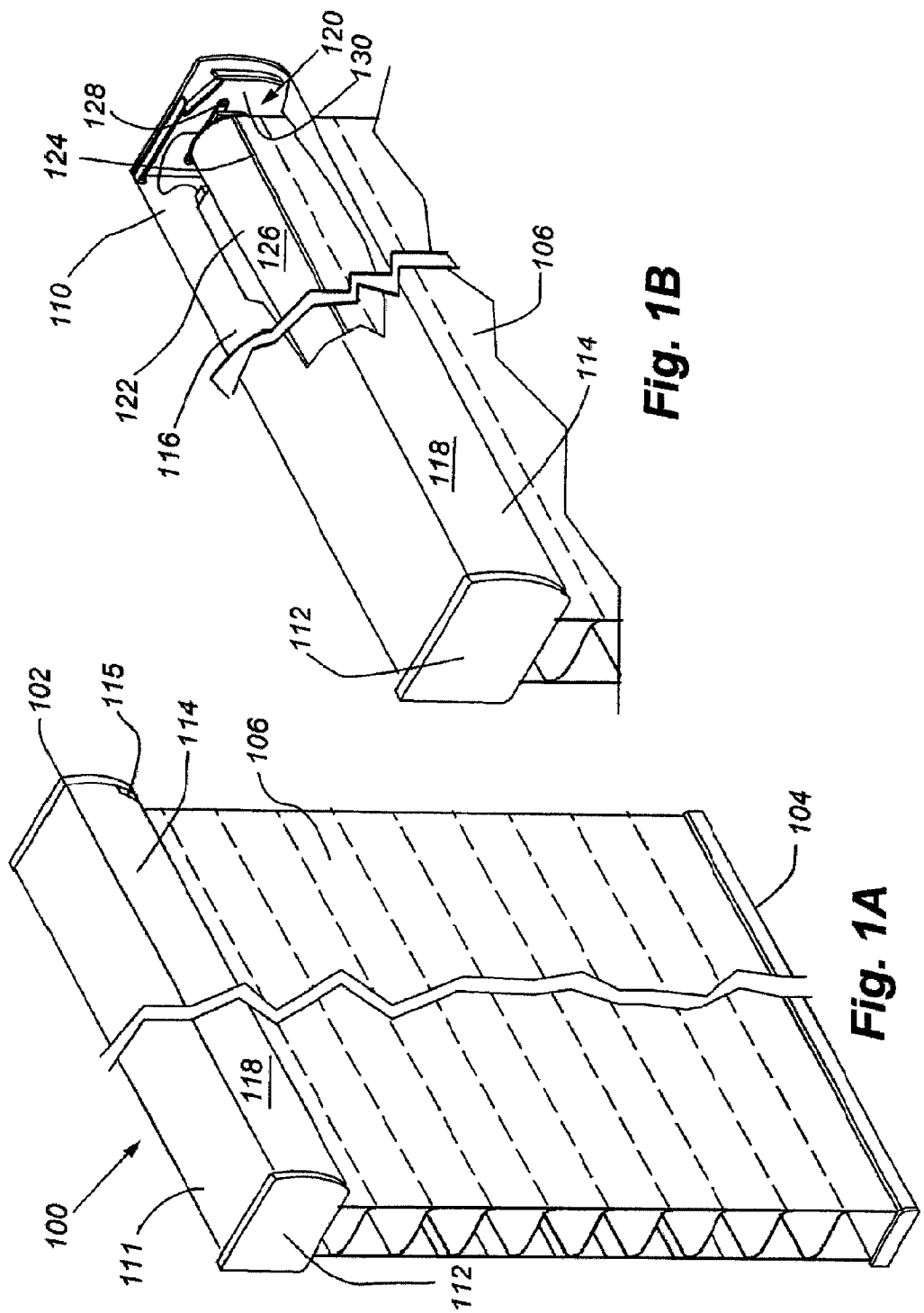

MOTOR ARRANGEMENT FOR WINDOW COVERINGS

CROSS REFERENCE TO RELATED APPLICATION

The present application is a continuation-in-part of U.S. patent application Ser. No. 12/177,330 ("the '330 application"), which was filed on Jul. 22, 2008, and entitled "PROGRAMMABLE MOTOR FOR WINDOW COVERINGS." The '330 application is incorporated by reference into the present application in its entirety herein.

FIELD

The various embodiments of the present invention relate to electrically powered coverings for architectural openings. More specifically, apparatuses, processes, systems and methods are disclosed for providing motorized operation for architectural window coverings.

BACKGROUND

Methods and systems for automatically controlling window coverings have become desirable over the past several decades. Such systems often utilize some type of motor to control the operation of the window coverings. This motor is often implemented within the top of the architectural window covering in a portion referred to as the "head rail". Because the motor may be implemented within the head rail, depending upon its size, it may cause the head rail to be undesirably large. It may be desirable to minimize the size of the head rail for a variety of reasons. For example, if the head rail is too large it may obstruct the view through the window.

The size of the motor often depends upon the mechanical torque and/or lifting requirements of the window covering, which in turn, may be dependent upon the size of the window that is being covered and the particular covering being used. In general, larger windows and/or heavier window coverings may require either a large motor that is capable of providing an adequate amount of torque or a smaller motor along with accompanying gearing to provide an adequate amount of torque. Both the larger motor and the smaller motor with accompanying gearing may undesirably consume a great deal of space within the head rail or may generate excessive noise. Thus methods and systems are needed for implementing and controlling motors in window coverings while minimizing their impact on the size of the head rail.

SUMMARY

An architectural window covering having at least one programmable electric motor is disclosed. The at least one programmable electric motors are housed within a tubular motor assembly that, in turn, is housed within a roller structure for raising and lowering said window covering. Further, the at least one motor may be physically linked together by a flexible connector. The at least one electric motor may be partially isolated from the tubular housing by the use of elastomeric damper material At least one aspect of the present invention includes an architectural window covering, including a shade; a roller defining a bore coupled to the shade; and at least two motors axially aligned and electrically coupled in parallel and positioned at least partially in said bore and rotatably coupled to the roller. Further, an elongated motor housing may define a cavity; and said at least two motors may be positioned at least partially in said cavity of said motor housing, which may be positioned at least partially in said bore, with the motor housing being rotatable relative to said roller. The at least two motors each have a motor drive shaft and are physically coupled by a flexible connector that connects the motor drive shafts.

Another aspect of the present invention may include an architectural window covering, including a shade; a roller defining a bore coupled to the shade; at least two motors axially aligned and electrically coupled in parallel and positioned at least partially in said bore and rotatably coupled to the roller; a switch having at least one state and for at least partially controlling the operation of the roller, the switch positioned in said bore; a light indicator positioned adjacent said switch and responsive to the state of said switch; a light pipe member positioned adjacent switch and said light indicator for receiving light emitted therefrom and transmitting the emitted light to be visible by a user, said light pipe member having a portion operably engaging the switch to allow operation thereof by the user.

Also included as an aspect of the invention is a method of operating an architectural window covering. The method may comprise the use of light pipes to program, alter, reset, and monitor the operation of the architectural window covering.

In addition to the various examples and embodiments described above, further aspects and embodiments will become apparent by reference to the drawings and by study of the following descriptions.

DESCRIPTION OF THE FIGURES

FIG. 1A is a perspective view of one type of window covering incorporating at least one aspect of the present invention.

FIG. 1B is a cut away view of the head rail in FIG. 1A showing the roller assembly and shade.

The use of the same reference numerals in different drawings indicates similar or identical items.

DETAILED DESCRIPTION

Figures 2A, 2B:
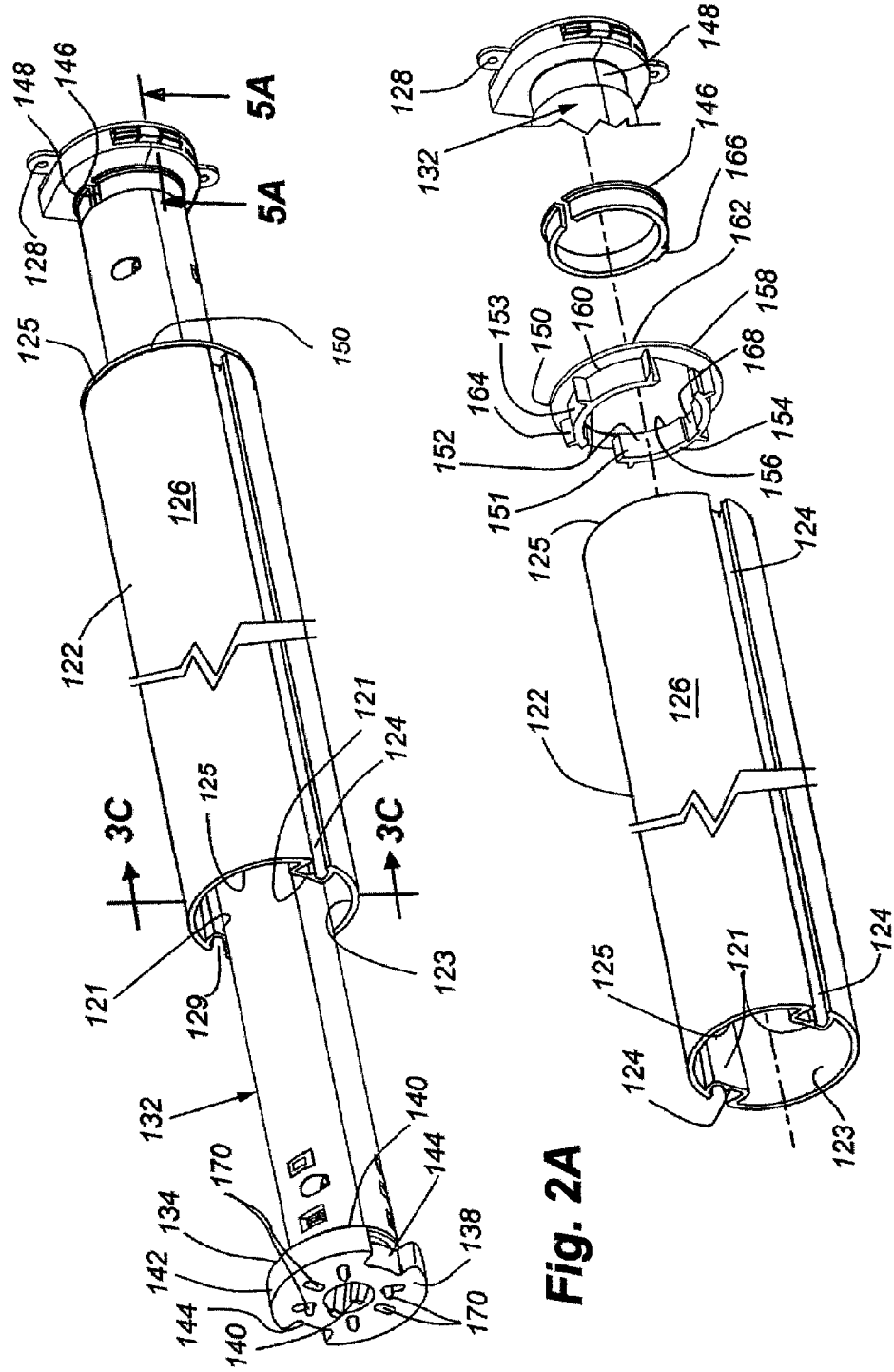
FIG. 2A is a partial view of a roller assembly showing part of the roller positioned around the motor housing assembly.
FIG. 2B is an exploded view of the roller, roller ring, and idler ring at the end plate end of the roller assembly.

A programmable motor arrangement that fits within a head rail of an architectural window covering is disclosed. The programmable motor arrangement may include at least two motors that are tandem stacked within the head rail along with accompanying circuitry. The motors are positioned within a clam-shell motor housing by a plurality of elastomeric dampers that may aid in reducing the transfer of motor vibrations to the housing. The motors may be physically linked using a flexible connector to aid in efficient stacking of the motors. By stacking the motors in a tandem fashion, the amount of radial space that they consume within the head rail may be minimized. Tandem stacking of the motors may also reduce the amount of work required by a single motor to lower or raise a shade and thus may aid in reducing the noise generated in raising and lowering the shade. Additionally, the motors may be electrically connected in parallel and controlled using pulse-width-modulated signals.

The programmable motor arrangement also may include one or more depressible switches mounted on a circuit board, having a microprocessor and associated control software, that may be positioned in the head rail of the window covering. In some embodiments, these switches may be located proximate to LEDs (light emitting diodes) that also are within the motor housing. The light from the LEDs are visible to the user through light pipes that extend to the exterior of the roller assembly. The light pipes may be coupled physically to the switches and optically coupled to the LEDs. In this manner, the combination of the switches, LEDs, and light pipes may operate jointly to allow the user to enter programming information into the microprocessor accompanying the motor arrangement. The LEDs may also be used to communicate failure of the embodiment and/or motor to the user, as well as other statistical, historical or operational information.

FIGS. 1A and 1B show an exemplary architectural window covering assembly 100 according to at least one embodiment. The window covering assembly 100 includes a head rail 102, a bottom rail 104, and a shade 106. (The terms "shade" and "covering" are used generally interchangeably herein.) In various embodiments, the head rail 102 and bottom rail 104 may be formed from aluminum, plastic, or other materials. The exemplary shade 106 shown in FIGS. 1A and 1B defines a functional shade and is made of a light fabric. Other shade embodiments include without limitation, pleats, slats, and/or other liftable coverings. Single sheet window coverings such as for example screens are also possible as are projector screens. In various embodiments the shade may be manufactured of a variety of materials, for example, fabric, fiber, plastic, paper, wood, metal, or combinations thereof. It is contemplated that the type of shade and its orientation and mode of actuation are not limited in the implementation of the invention described herein.

As seen in FIGS. 1A and 1B, the head rail 102 may include a number of panels. The present embodiment includes a front panel 114, a top panel 111, and end caps 112. The front panel 114 may also define at least one opening or window 115 that may be positioned at or near the edge of the front panel at or near an end cap. The window 115 may be positioned to allow physical and visual access to one or more actuation features, such as buttons, which will be described in greater detail below.

The panels 111, 114 and end caps 112 of the head rail 102 may further define a cavity 116 within the head rail 102. The front panel 114 may be hinged by pins (not shown), attached at its upper end corners, to the end caps 112. This may facilitate access to the cavity 116 within the head rail 102 behind the front panel's front surface 118. Alternatively, the front panel 114 may be hinged to the bottom member (not shown), or even be fully removable and snapped onto the rest of the head rail 102.

In various embodiments, a plurality of lift cords may descend from within the head rail 102, pass through the cells of the shade 106, to the bottom rail 104 where they are secured. As such, the weight of the bottom rail 104 and the shade 106 may be supported by the lift cords. It should be noted that, in some embodiments, while lift cords may be tubular strings, alternative exemplary implementation may also be found. The lift cords may be made of any type of material and take many physical forms, such as ribbon shaped pieces of fabric or the like. In some embodiments, the lift cords may be eliminated altogether and the shade 106 may be rolled upon a shaft or roller 122 within the head rail 102.

FIG. 1B shows a cutaway of the head rail 102 allowing a view of a shade/roller assembly 120 positioned within the cavity 116. In this view, interior surfaces of a back panel 110 and end caps 112 are visible. In the presently depicted embodiment, the shade 106 is attached to a roller 122 at one or more horizontal grooves 124 in the exterior surface 126 of the roller 122. Other embodiments may attach the shade 106 to the roller 122 other than by use of a groove. The shade/roller assembly 120 is rotatably connected to the head rail 102 by an end plate 128 attached to the interior surface 130 of the end caps 112. The end plate 128 may be held in place by screws, glue, or by support of a shelf structure on the surface 130 of the end caps 112. When the roller assembly 120 rotates one direction under the control of the microprocessor, the shade rolls up on the roller assembly to retract the shade. When the roller assembly rotates in the other direction, the shade unrolls from the roller assembly to extend the shade. When not rotating, the roller assembly is kept from rotating by a brake, which may be mechanical or dynamic in nature. The brake assembly is described in detail below.

FIG. 2A shows the shade/roller assembly 120 with a partially cut away roller 122. Positioned inside the roller 122 is a motor tube assembly 132. The motor tube assembly 132 is a generally cylindrical structure with one end fixedly mounted at or near the end plate 128, and the opposite end engages a drive ring 134. The drive ring 134, as described below further engages both the motor assembly 132 and the roller 122.

The drive ring 134 is generally doughnut-shaped and defines a first surface (not observable) positioned toward the center of the motor assembly and a second surface 138 positioned away from the center of the motor tube assembly 132. The drive ring 134 is attached to the motor tube assembly 132 by engagement of a plurality of projections 170 from the motor tube assembly 132 that extend through the drive ring 134 beyond the second surface 138. The projections 170 engage the drive ring 134 to form a keyed structure, which may take any number of shapes and structures. The drive ring 134 defines an inner perimeter 140 and an outer perimeter 142. The outer perimeter 142 is not continuous but is interrupted by at least one notch 144 which extends radially inward from the outer perimeter 142 to create a recess in the outer perimeter 142. This notch 144 corresponds to and is designed to engage inner radial projections 121 formed by the groove 124 of the roller. The outer perimeter 142 of the drive ring 134 is designed to allow the drive ring 134 to fit into and engage the radial projections 121 on the interior surface 123 of the roller 122. This engagement structure formed between the roller 122 and the drive ring 134 may allow the roller 122 to be rotated by the movement of the drive ring 134.

At the end of the motor tube assembly 132 opposite the drive ring 134 is positioned an idler ring 146. The idler ring 146 may be slid over the motor tube assembly 132. The idler ring 146 sits in a channel 148 at or near the end of the motor tube assembly 132. The idler ring 146, has a slit therein to allow it to fit over the motor tube assembly 132 and be received in the channel 148. The slit may allow the idler ring 146 to be opened so that it may more easily fit over or around the diameter of the motor tube assembly 132 or the channel 148.

As shown in FIG. 2B, the idler ring 146 is designed to fit with a roller ring 150 attached to the roller 122. The roller ring 150 includes a split collar 152 structure with an inner axial edge 154 positioned toward the middle of the length of motor tube assembly 132 and an outer axial edge 156 positioned toward the end plate 128. Extending radially from the outer edge 156 of the collar 152 is a cap or flange structure 158. The cap structure 158 further defines an inner surface 160 that contacts the end shoulder 125 of the roller 122, and an axial outer surface 162 that faces the end plate 128. Extending radially from the collar 152 are a plurality of fins 164 which are designed to engage the inner surface 123 of the roller 122. The sections 151, 153 in the collar 152 are spaced apart and are designed to accept the radial internal projections 121 formed by the grooves 124 of the roller 122 and aid in securing the roller ring 150 to the roller 122. When mounted in the roller 122, the fins 164 engage the internal diameter of the roller 122, and the radial internal projections 121 are positioned in the gaps between the sections 151, 153 of the collar 152. This engagement structure causes the roller 122 and collar 152 to rotate together. The idler ring 146 fits within the roller ring 150 and is held in place by a raised key 166 in an outer surface of the idler ring 146 that corresponds to a slot 168 in the inner surface of the collar 152. When in place, the roller ring 150 and idler ring 146 position the motor tube assembly 132 generally in the center of the roller 122 and allow the roller 122 to rotate about the motor assembly 132.

Figure 3A:
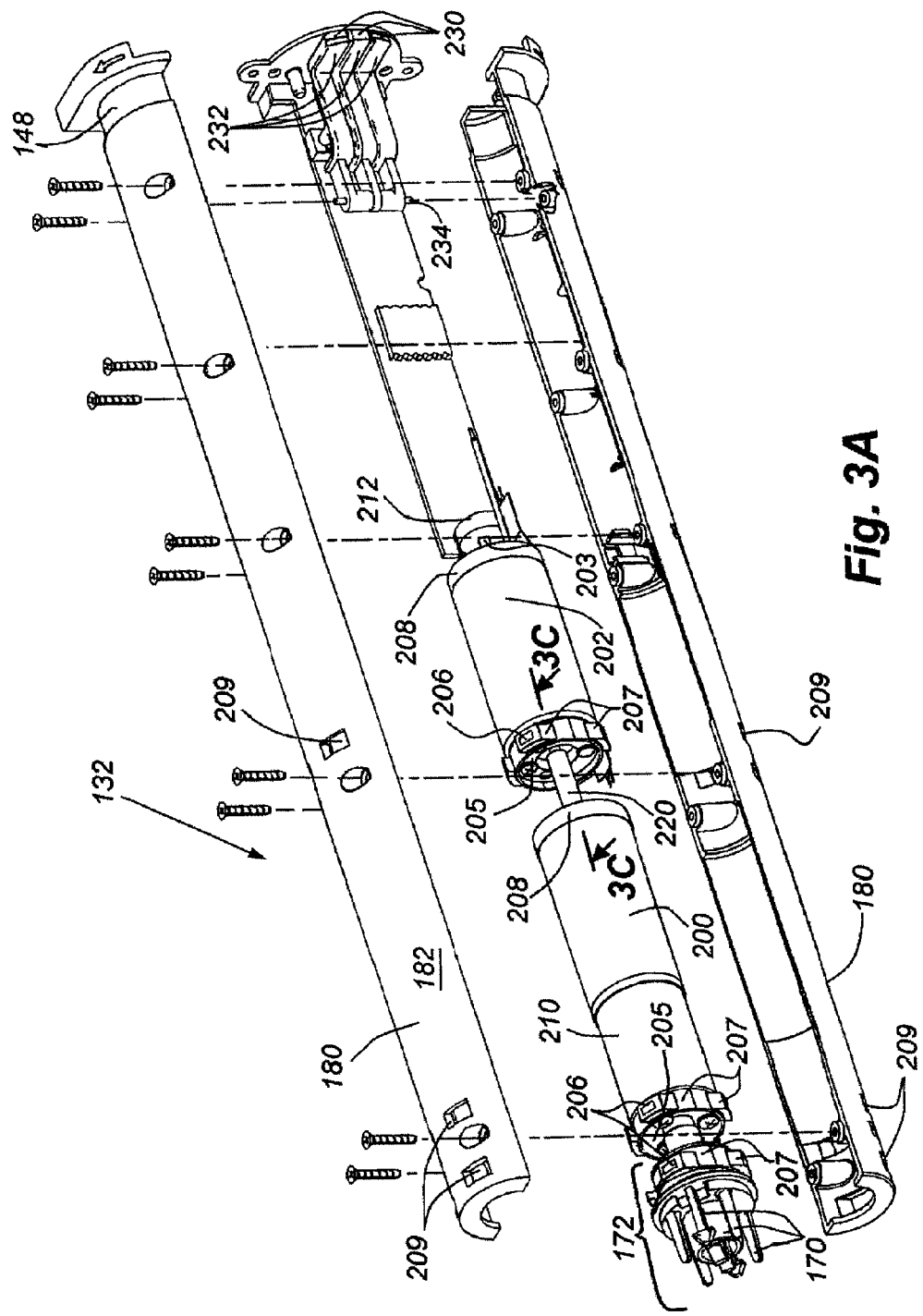
FIG. 3A is an exploded view of the clam-shell housing forming the motor housing assembly.

FIG. 3A shows the motor tube assembly 132 exploded to show the structure of the clamshell 180. With the drive ring 134 removed, the projections 170 that transit through the drive ring 134 are visible. As will be discussed in FIG. 3B, these projections 170 extend from a shaft tube drive connector which in turn is part of a brake assembly structure 172. Adjacent the brake assembly 172 is a first tubular motor 200 and a second tubular motor 202. Extending from the ends of the motors 200, 202 are at least one drive shaft. Only one drive shaft 203 is visible in this figure, and it extends from the second motor 202 toward the end plate. A magnet 212 is attached to this drive shaft 203. The magnet 212 is positioned adjacent a Hall effect sensor (not shown) which aids in controlling the raising and lowering of the shade 106.

To keep the motors 200, 202 from spinning relative to the clamshell housing 180, mounting plates 205 may be affixed to the motors 200, 202. In the present embodiment mounting plates 205 are affixed to the ends of the motors 200, 202 nearest the drive ring 134. Other embodiments may position the mounting plates 205 at opposite or adjacent ends. In further embodiments the mounting plates 205 may be affixed at other than the ends of the motors 200, 202.

The mounting plates 205 have radial tangs 206 that extend through mounting holes 209 in the surface 182 of the clamshell housing 180 to rotationally anchor the motors 200, 202 and brake assembly 172. The tangs 206, depicted in FIG. 3B, may terminate at or near the outer surface 182 of the clamshell housing 180. A damper 207 covers the mounting plates 205. The damper 207 wraps around the tang 206 to form a collar. The mounting plate 205 dampers 207 of the present embodiment depicted in FIG. 3B comprise two semi-circular pieces, however unitary dampers may also be used. There may be unitary dampers 208 positioned at the opposite end of the motors 200, 202 from the mount plate 205 dampers 207.

The collar 211 structure of the damper 207 surround the tangs 206 at the mounting holes 209. In operation, the motors 200, 202 may be held generally stationary within the clamshell housing 180 by the tangs 206 of the motor plates 205 extending through the mounting holes 209 of the clamshell 180. The dampers 207 may aid in reducing vibrations generated by the motors 200, 202 by forming an buffering layer between the motor plate 205 and the clamshell 180 and by surrounding the tangs 206 with the collars 211. FIG. 3C is a sectional view showing the damper 207 layered between the mounting plate 205 and the clamshell housing 180.

The damper material may be an elastomer, for example, without limitation, urethane. In the present embodiment the dampers 207, 208 are constructed from Santoprene 55 Shore A. The dampers 207, 208 may help to isolate motor vibrations from the clamshell housing 180 and electronics contained therein, and the dampers 207 208 may also help to reduce operational noise. In various embodiments, additional damper material may be used other than at the ends of the motors.

Figure 3B:
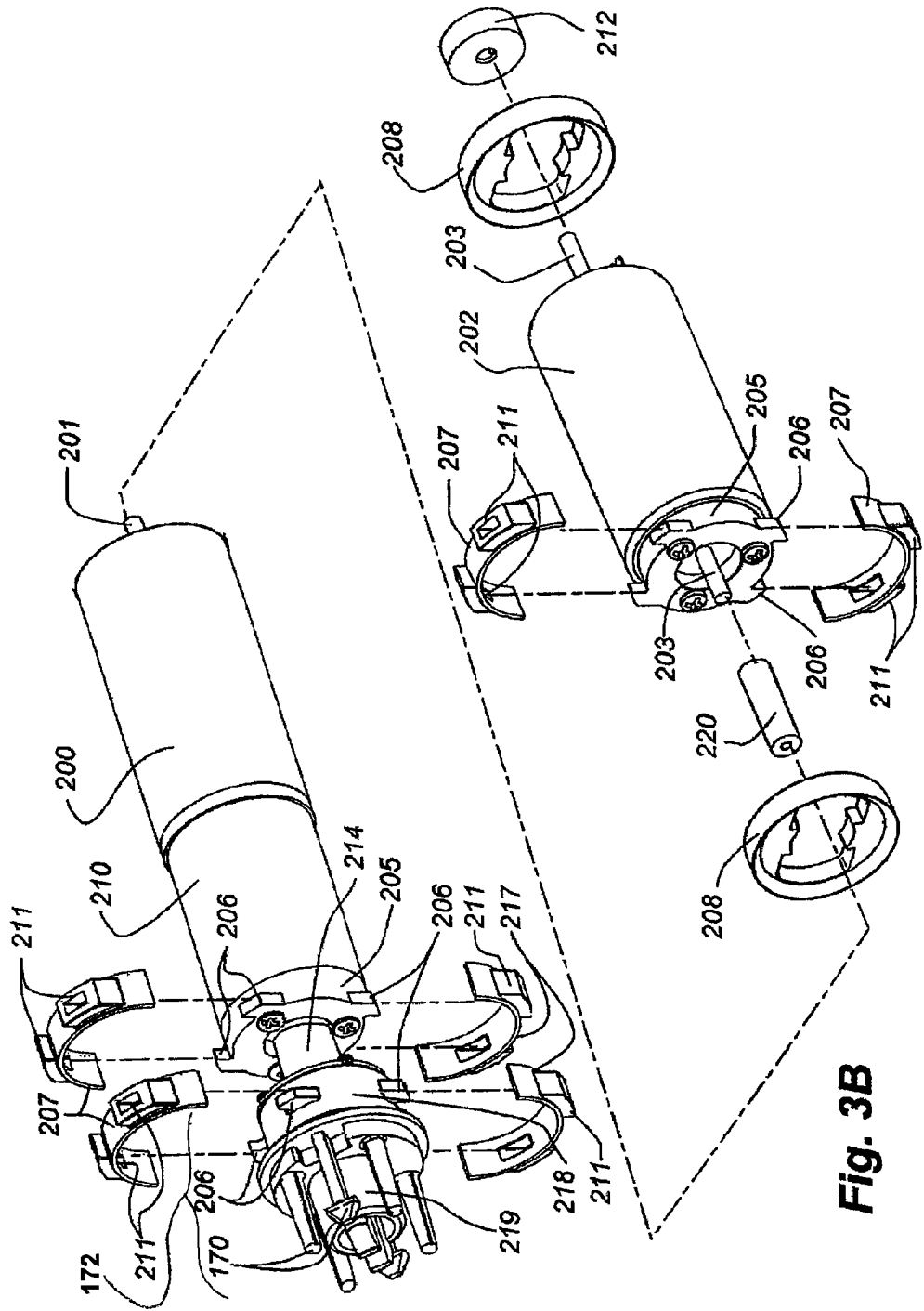
FIG. 3B is an exploded view of the motors, gearbox, and brake assembly.
Figure 3C:
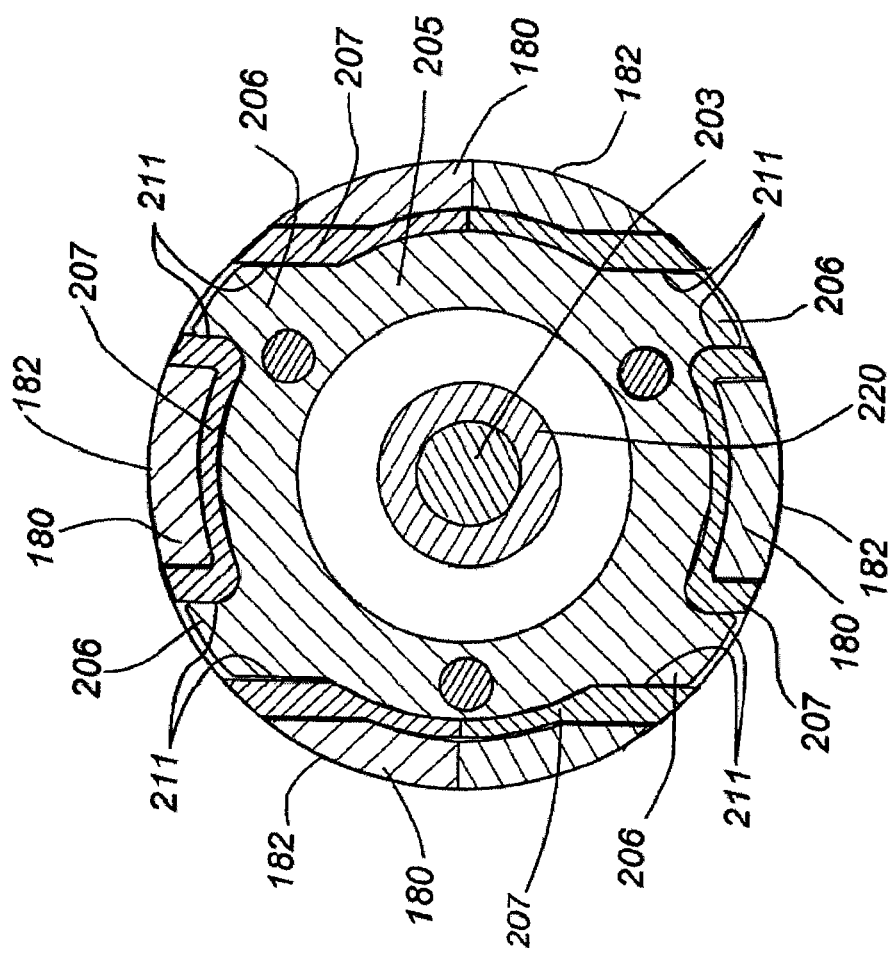
FIG. 3C is section view taken along line 3C-3C in FIG. 2A.
Figure 3D:
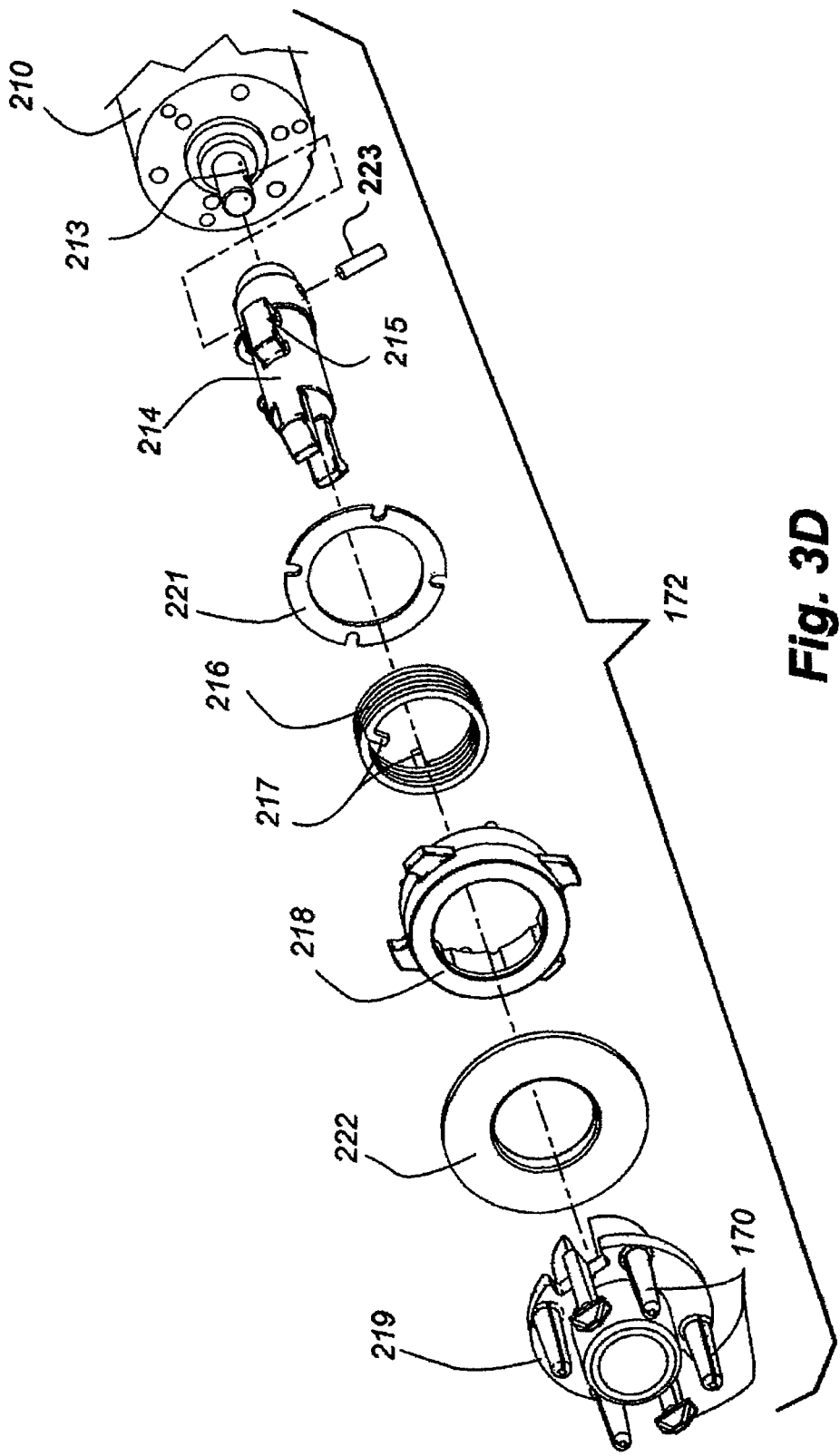
FIG. 3D is an exploded view of the brake assembly.
Figure 3E:
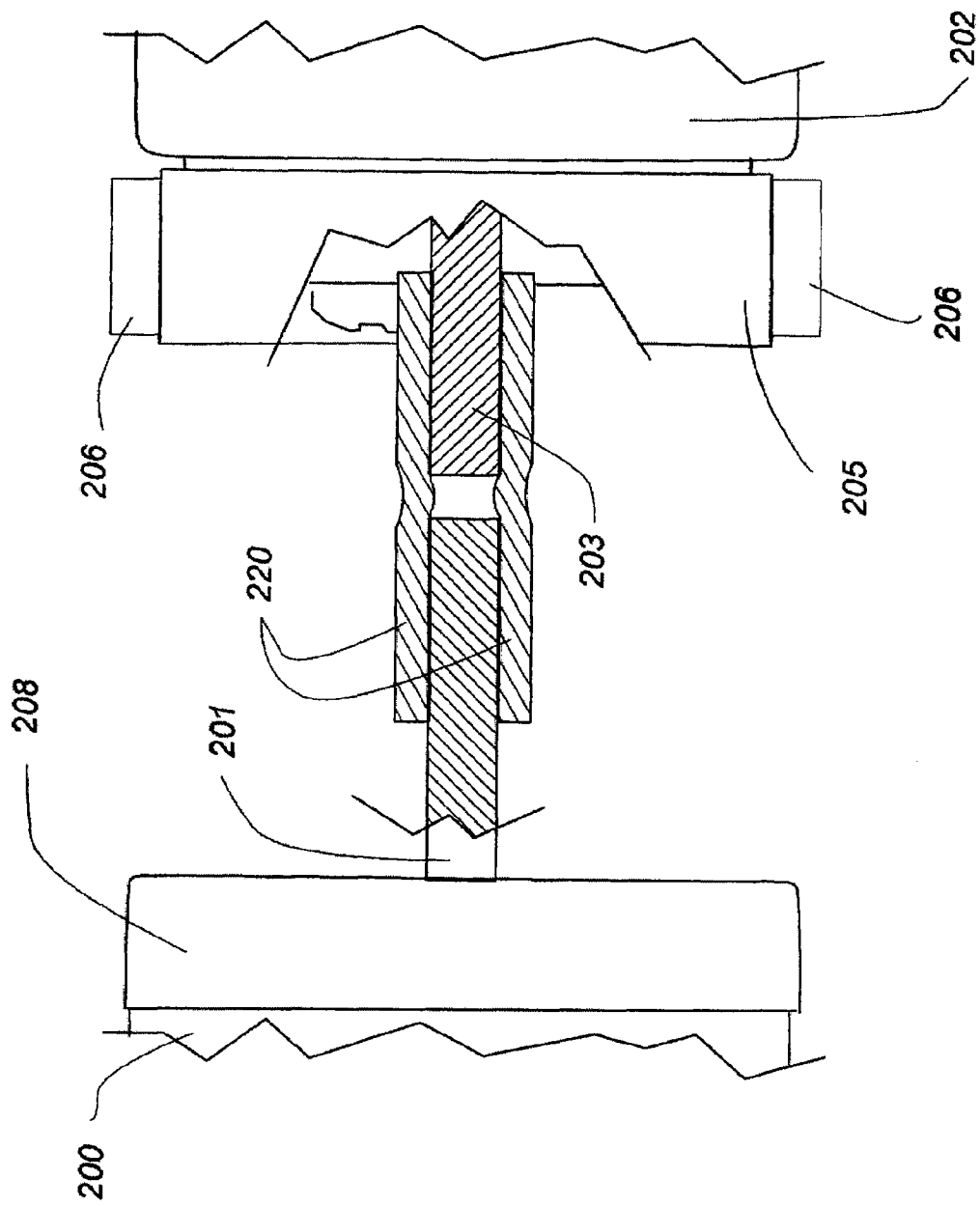
FIG. 3E is a section view between the motors taken along line 3E-3E of FIG. 3A.

Returning to a description of the tandem stacked motors, FIGS. 3B and 3D show the connectedness of the motors 200, 202 and brake assembly 172. These figures show a motor shaft 201 extending from the first motor 200 and a second motor shaft 203 extending from the second motor 202. The motor shaft 201 of the first motor 200 may extend through the motor 200 and extend from either end. The shaft 201 extends from the side of the first motor 200 nearest the brake assembly 172, into a gear box 210, where the rotational speed of the motor shaft 201 may be translated to a faster or slower rotation of a drive shaft 213. In the instant case, the shaft 201 engages the gearbox 210 at a certain rpm and torque, and the output shaft 213 from the gearbox 210 has an output of lower rpm and higher torque for operating the shade 106. In one example, the gearbox has a 102:1 ratio, and the output is about 28 rpm with approximately 1 Nm torque. The drive shaft 213 may be inserted into a gear box shaft connector 214 and fixedly attached by a pin 223 that may traverse the gear box shaft connector 214 and the drive shaft 213 through corresponding aligned holes. The gear box shaft connector 214 further defines two radial protrusions 215. The radial protrusions are designed to engage the inward pointing tabs 217 of a brake spring 216 that the gear box shaft connector 214 is positioned within. The radial protrusions 215 of the gear box shaft connector 214 also fit within a shaft tube drive connector 219. The braking spring 216 may be further held in place between a brake mount plate 218 and a brake body cap 221 which is fixedly attached to the brake mount plate 218 by a plurality of screws. The shaft tube drive connector 219 is physically separated from the brake mount plate 218 by a centering washer 222. An acceptable motor for use in this configuration may include a 12-volt motor, with a 102:1 gear ratio in 3 stages, with an rpm, which may be electronically controlled, of approximately 34. Such a motor may be available from Buhler Motor. Other motors having similar or different performance characteristics may be acceptable also.

During operation the motors 200, 202 rotate the motor shafts 201, 203. The first motor shaft 201 is coupled to the gear box 210 and causes the drive shaft 213 to be rotated either faster, slower, or the same speed as the motor shaft 201 depending on the gear ratio, which in one embodiment is 1:32. As depicted in FIG. 3D, the drive shaft 213 in turn causes the gear box shaft connector 214 to rotate which in turn causes the shaft tube drive connector 219 to rotate. Rotation of the shaft tube drive connector 219 causes the drive ring 134, which is securely held by the plurality of protrusions 170, to rotate the roller 122 causing the shade 106 to be raised or lowered.

Braking may be accomplished by engaging the tabs 217 of the brake spring 216 and the radial protrusions 215 on the gear box shaft connector 214. When the shaft is not rotating the spring 216 is expanded and pushes against the brake motor housing 218 thus keeping the shade from unfolding. When the motors cause the drive shaft 213 to begin turning, the radial protrusions 215 engage the tabs 217 causing the brake spring 216 to be compressed and releasing it from the brake mount 218 and allowing the gear box shaft 214 to rotate freely. If the roller 122 begins to rotate backward, such as when there is no motor activity, tabs on the shaft tube drive connector 219 engage each other (not shown), causing the brake spring 216 to expand and push again against the interior surface of the brake mount 218 and stop the backward, roller initiated rotation.

Braking may also be accomplished by using a dynamic brake rather than a spring brake. The dynamic brake may work, as described here and further below, by using a MOSFET H-bridge (and a relay contact shorting the motor). Starting up, the field-effect-transistor (FET) brake may be turned on. The relay may also be turned on causing the short to be removed. Then the motor may be turned on. If the motor turns clockwise the top right FET may be on all the time, and the lower left FET may be pulse width modulated (PWM) appropriately to aid in setting the speed. Speed may be measured by timing between magnet 212 transitions, and the PWM signal may be updated every 20 ms or more or less often. If the speed of the motor is relatively high when the PWM signal approaches zero, then the top FET may be turned off and both lower FETs may be simultaneously pulse width modulated to initiate a "braking PWM" mode. If the speed is too low when the PWM approaches zero, then the system may then be returned to a powered state. Stopping the motor may involve turning on both lower FETs, and turning off the relay which may cause the motor to short. When the power is shut off, the relay may hold the motor.

The motor shafts 201, 203 of the two tubular motors 200, 202 may be functionally connected by a tubular flexible connector 220 that fits over the shafts 201, 203 that extend from each motor 200, 202 toward the other motor. As shown in FIGS. 3A, 3B, and more clearly in 3E, the tubular flexible connector is sized to fit securely over adjacent motor shaft 201, 202 ends of the tandem stacked motors 200, 202. The flexible connector 220 may engage approximately inches of the shaft, with a gap of approximately y inches between the shaft ends. In operation, the flexible connector accommodates the shafts being out of axial alignment, as well as the rotation of the shafts not being identical. This is due to the flexible connector being resistantly deformable in torsion, as well as being bendable along its length. The flexible connector 220 allows the two motors to work in tandem without requiring a rigid coupling. Use of the flexible connector 220 decreases the alignment requirements of tandemly linking the two motors with a rigid connector, and therefore decreases the assembly cost of the housing 132. In the current embodiment the flexible connector 220 is constructed of neoprene having an inner diameter of 1/16 inch and an outer diameter of 3/16. In various embodiments the flexible connector may be manufactured from other suitable materials and have other sizes. The motor shaft connector 220 may not be cylindrical or tubular in shape, other embodiments may have other structural shapes to aid in connecting the two motor shafts 201, 203. For instance, the connector may have a solid portion positioned between the shafts 201, 203, or the connector may have different geometrical shapes.

The shade 106 may be raised and lowered by operation of the motors 200, 202. The operation of the motors 200, 202 may be controlled through various methods, such as without limitation, infrared, radio frequency, hard wired controls, and buttons 230 positioned at the window 115 in the front panel 114 of the head rail 102. FIG. 3A depicts three buttons 230 located near the end plate 128 of the motor tube assembly 132. The buttons 230, (also referred to herein as the user engagement end), define the termini of three light pipes 232. The light pipes 232 are pivotally attached to a post 234 in the center of the clamshell housing 180, as described in more detail below.

Positioned behind the light pipe actuators 232 is a circuit board 306. The circuit board 306 may have a microprocessor 305 (shown below in FIG. 7) and a plurality of switches 242. The microprocessor 305, as described in detail below, may aid in programming, controlling, and monitoring the movement of the motors 200, 202 and user initiated input. The microprocessor 305 may receive input from the user in the form of radio frequency, hard wired electrical signals, infrared, or signals generated by manipulation of the light pipe actuators. In addition, the microprocessor may monitor the movement of the motors through inputs from a plurality of sensors positioned near the magnet at the end of motor number two 202. Thus the microprocessor may turn on, turn off, reverse, accelerate, slow down the motors through integration of a variety of signals.

Figure 4:
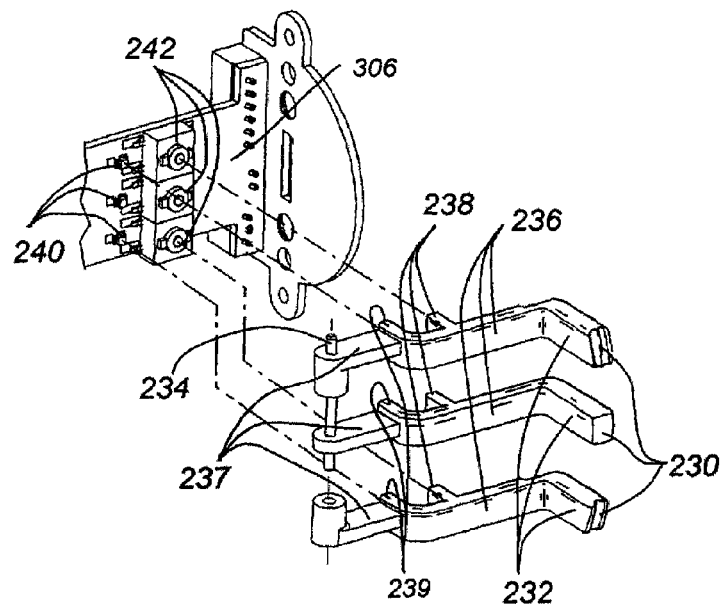
FIG. 4 is a partial exploded view of the light pipe switch assembly, including the circuit board.

The light pipe actuators 232 may be more fully described by reference to FIGS. 4, 5A and 5B. The present light pipe actuators 232 each may include a main body 236 having user engagement end 230, a light receiving end 239 and a switch engagement extension 238. In the embodiment shown in FIGS. 4, 5A, and 5B, the light pipe actuator 232 user engagement end 230 may take the form of a button 230. A flange 237 extends from the light receiving end 239 to receive through a hole 235, a pivot pin anchored to the housing and about which the light pipe actuators 232 pivot. When positioned in the clamshell motor housing 180 and engaged with the pivot pin 234, the light receiving end 239 is adjacent to or contacting the corresponding LED, and the user engagement end 230 is positioned in the window and is accessible by a user. The light receiving end 239 is bent at a right angle to the main body, while the user engagement end 230 is bent at a right angle in the opposite direction. The switch is spring loaded to bias the light pipe actuator 232 outwardly and against a retaining shoulder of the housing (See FIG. 5A).

Light emitted from the LED 240 enters the light receiving end 239 of the light pipe 232. The light then travels the length of the main body 236 and is emitted from the light pipe at the user engagement end 230. The smooth and rounded nature of the main body 236 of the light pipes 232 aids in transmitting the light from the LED to the button. In addition the selected material for light pipe 232 manufacture may also aid in light transmission. For example, light pipes 232 may be made out of a rigid translucent material such as plastic or glass. In the current embodiment, the light pipe 232 is constructed from Lexan.

As described above, the light pipes 232 may have at least two functions. First, the light pipes 232 may transmit light from the LEDs 240 positioned at the opposite end of the first portion 236 of the light pipes 232 to the button. Second, the light pipes 232 may aid in the manual control of the motor tube assembly 132 through the actuation of at least one switch 242 positioned at or near the switch engagement portion 238 of the light pipe 232.

Figure 5A:
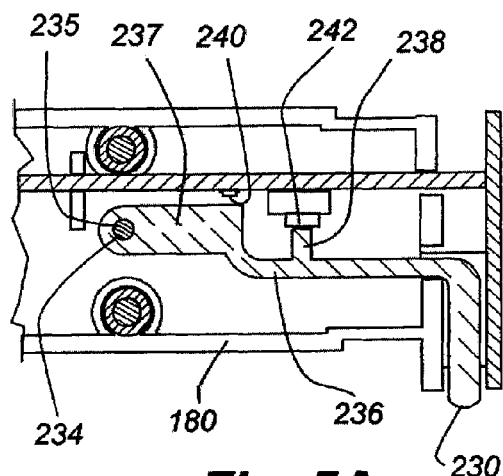
FIG. 5A is a section view taken along line 5A-5A of FIG. 2A showing a light pipe actuator in the undepressed position.
Figure 5B:
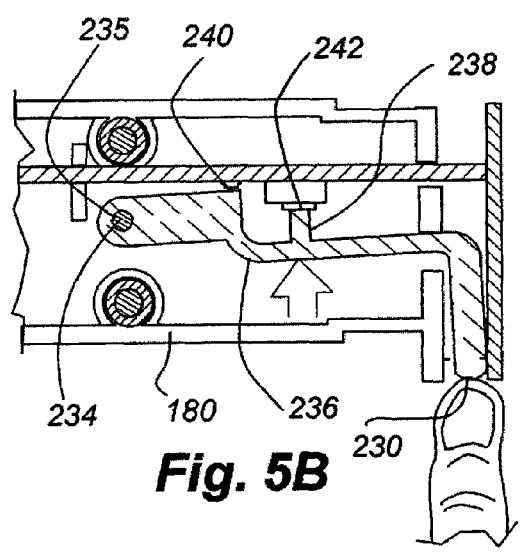
FIG. 5B is a section view similar to FIG. 5A showing a light pipe actuator in the depressed position.

Manual control of the motor tube assembly 132 is depicted in FIGS. 5A and 5B. The one or more switches 242 and the one or more LEDs 240 in combination with the one or more light pipes actuators 232 may communicate various operational and/or programming options to the user, and allow the user to communicate commands to the microprocessor 305. For example, the one or more light pipes 232 may couple light from the one or more LEDs 240 to the user viewing the front panel 114. Additionally, the one or more light pipes 232 may be physically pressed by the user, and the one or more light pipes 232 in turn, may couple this to the to the one or more switches 242. Thus, the one or more light pipes 232 may provide mechanical coupling of the one or more switches 242 through the motor housing assembly 132 and the headrail 103 to the user.

In some embodiments, the user may program predetermined thresholds (i.e. limits) using the one or more light pipe actuators 232. These thresholds may include how far up or down the shade 106 may be within the window. Also, the one or more LEDs 240 may be used to echo the programming selections and/or stored threshold values back to the user during programming. In some embodiments, these thresholds may be changed dynamically by the user operating the shade 100.

The buttons 230 of the current embodiment may emit different colors. For example, one button 230 may emit red light and be used in setting the upper limit of the shade, while the green button may be used to set the lower shade limit. A yellow button may be used to clear any limits and/or re-establish factory settings. In various other embodiments the colors and functions associated with specific buttons may vary One exemplary implementation of the switches 242, the LEDs 240, and the light pipes actuators 232, as shown in FIGS. 5A and 5B, will now be discussed. The pivot extension 237 of the light pipe 232 may define a post hole 235 whereby the light pipe 232 may pivot about this hole 235 when the light pipe 232 is pivotally fixed through the hole 235. Further down the light pipe 232 the switch engagement extension 238 may extend off and rest on the switch 242. The light pipe 232 may protrude through the clamshell housing 180 and the front surface 118 of the head rail 102 allowing the user to depress the user engagement end 230 to actuate the switch 242. By depressing the light pipe activator 232 at the user engagement end 230, the light pipe 232 may rotate about the pivot post 234 and cause the switch engagement extension 238 to push on the switch 242. Activating the switch changes its state and provides instructions to the microprocessor.

Thus, after installation of the architectural window covering, a user may initiate operation by depressing a pre-determined combination of light pipe actuators. This may in turn initiate a pre-programmed series of set-up modes to allow the user to set maximum and minimum shade positions, speed of shade movement and other desirable parameters. The microprocessor may integrate the signals received from either user input through the light pipe actuators, radio frequency signals, or a remote keypad. The microprocessor then relays the signals to the motors to speed up, slow down, stop or reverse, while monitoring the operation of the motors through signals generated by the Hall effect sensor and encoder.

During operation, the motors 200, 202 may be electrically coupled together in a parallel fashion. In some embodiments, the motors 200, 202 may be controlled using a pulse-width-modulated (PWM) signal. By varying the duty cycle of the PWM signal the average voltage delivered to the motors 200, 202 may be controlled to match the operating conditions of the architectural window covering 100. For example, a low average voltage for the PWM signal (e.g., duty cycle 20%) may correspond to moving the architectural window covering 100 relatively slowly while a high average voltage for the PWM signal (e.g., duty cycle 80%) may correspond to moving the window covering relatively quickly.

By implementing two or more tandem stacked motors, the head rail 102 may be kept compact while providing additional torque to increase the mechanical strength provided to operate the architectural window covering assembly 100. For example, if the architectural window covering assembly 100 is fashioned about an unusually long window, so that the weight of the architectural window covering may be greater than normal, one or more additional tandem stacked motors may be added to the head rail 102 as necessary to handle the additional mechanical strength requirements.

In addition, the use of multiple tandem motors may allow certain embodiments to generate sufficient torque to raise or lower the shade 106 (or other covering for an architectural opening) while simultaneously reducing gearbox ratios. In a standard drive system for a shade, a single motor requires a relatively high rotational speed given the gearing of the motor. This, in turn, often leads to the motor producing an audible noise during operation. By contrast, certain embodiments may operate the motors 200, 202 at a lower speed since the dual-motor arrangement may generate torque equivalent to a single-motor system operating at a higher speed. Accordingly, the operational noise of the present embodiment may be reduced and, in some cases, relatively inaudible (depending on placement of the embodiment and distance to a listener).

Figure 6:
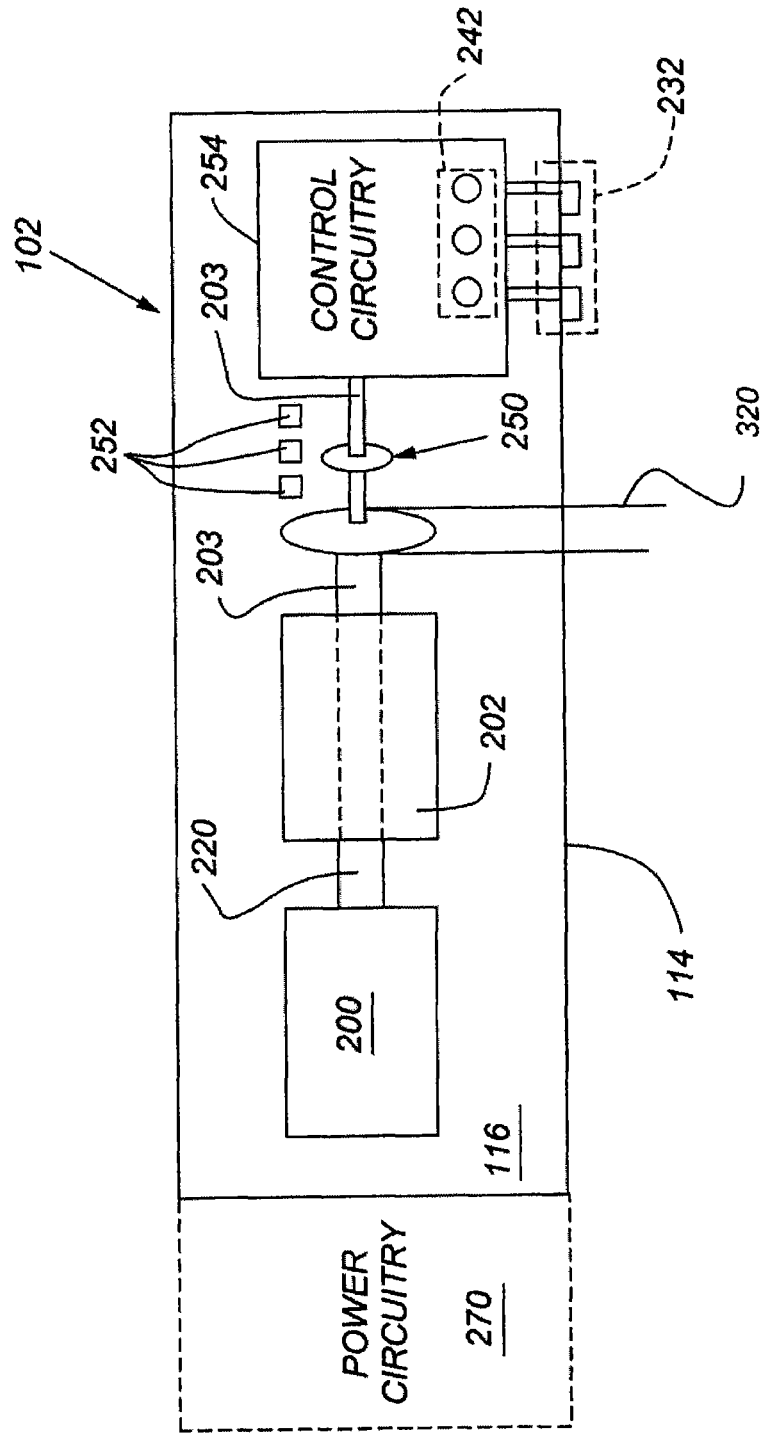
FIG. 6 is schematic view of the tandem motors, circuit board, shade actuator mechanism, position indicator and switches.

As illustrated with the schematic representation in FIG. 6, a drive rail encoder 250 may be coupled to a motor shaft 203. The encoder 250 may include multiple regions (depicted as alternating black and white pie shaped regions on the circular encoder 250) angularly positioned about a motor shaft 203. As the motor shaft 203 rotates, regions on the encoder 250 pass by one or more angular sensors 252 that may be read by a control circuit 254. (The control circuit 254 is described in more detail below with regard to FIG. 7). During operation, the encoder 250 may indicate angular movement of the motor shaft 203, such as the angular position, velocity, and/or acceleration of the motor shaft 203 to name but a few. In some embodiments, a microprocessor 305 (described more fully below) may use signals generated by the sensors 252 reading the movements of the encoder 250 to monitor and regulate the movement of the motors 200, 202. For example, the microprocessor 305 may monitor movement of the motors 200, 202 to track the position of the shade 106 in the window. If the microprocessor detects that the shade 106 is traveling too fast or beyond its programmed limits, the microprocessor 305 may send a signal to the brake to slow or stop the motors 200, 202.

The control circuitry 254 may convert angular movement reported by the one or more sensors 252 into electrical impulses in analog or digital form for further processing. One or more switches 242 may be coupled to the control circuitry 254. The switches 242 may be capable of receiving user input, for example, by acting as a depressible switch that is electrically coupled to the control circuitry 254. The control circuit 254 also may couple to one or more LEDs 240 that emanate light. In some embodiments, the LEDs 240 may communicate the operational status of the window covering 100 to the user as described above. In other embodiments, the LEDs 240 may communicate user programming settings effectuated through the one or more switches 242.

Figure 7:
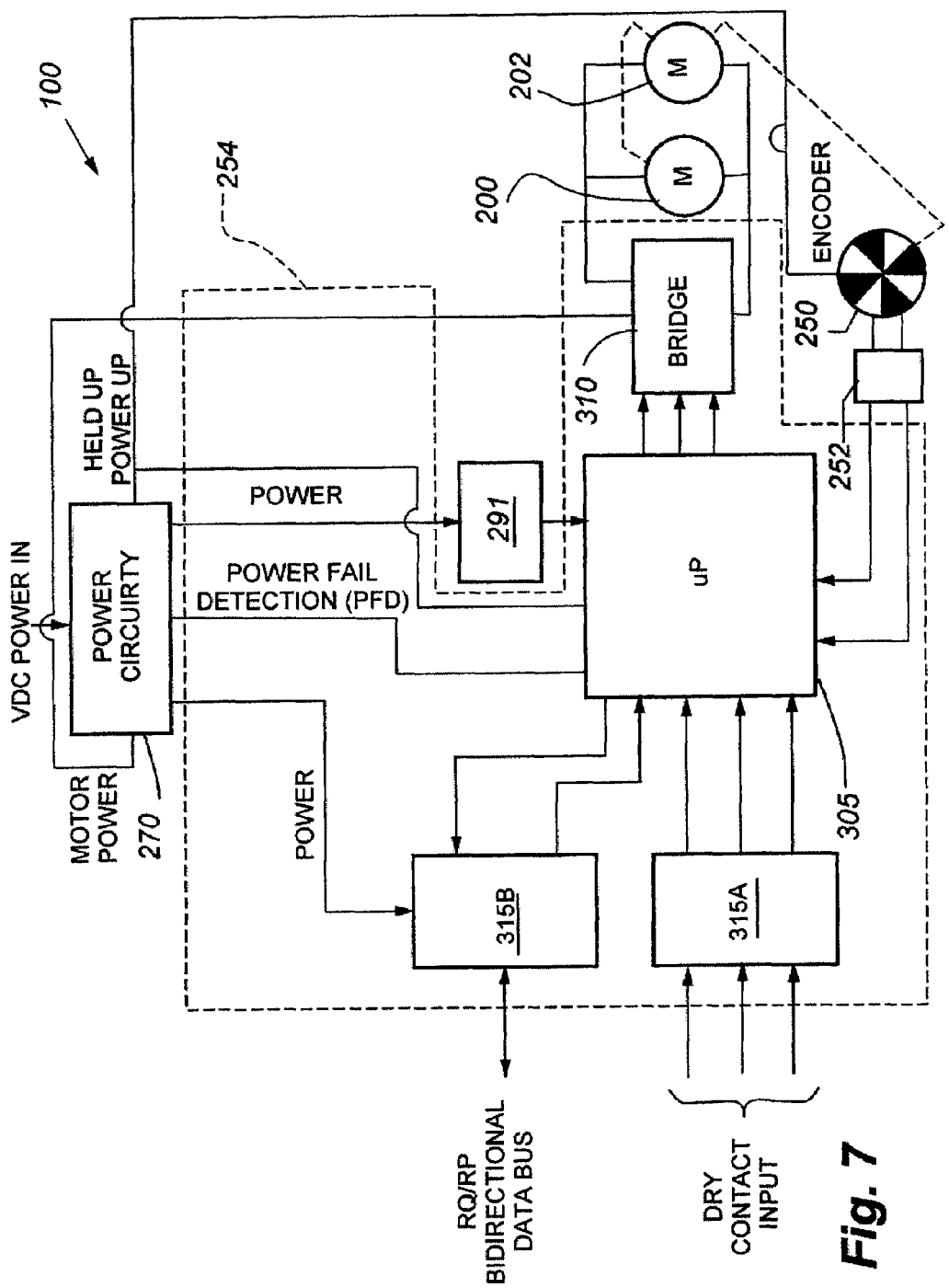
FIG. 7 is an exemplary block diagram of a window covering.

FIG. 7 represents a block diagram of the widow covering assembly 100 illustrating an exemplary configuration for the control circuitry 254. As shown, the control circuit 254 may include a microprocessor 305 coupled to a bridge circuit 310. In some embodiments, the bridge 310 may include one or more field-effect transistors (FETs) that provide power to the motors 200, 202. In other embodiments, the bridge 310 includes insulated gate bipolar transistors (IGBTs) that combine the advantages of a FET with the advantages of a bipolar transistor when providing power to the motors 200, 202. During operation, the microprocessor may monitor angular measurements of the motors 200, 202 from the combination of the sensor 252 and the encoder 250.

Angular measurement may also be obtained from the magnet 212 and Hall effect sensor 252, insofar as the sensor 252 may detect every time a certain magnetic polarity is adjacent the sensor. Further, the sensor 252 may measure the period of each such transition. Based on these angular measurements and the periods of transition, the microprocessor 305 may determine the distance traveled and velocity of the shade 106. Additionally, based upon measurements from the combination of the sensor 252, the encoder 250, and the up and down thresholds of the architectural window covering 100 set by the user, the microprocessor 305 may determine the position of the architectural window covering 100 with respect to its upper and lower extension limits. The microprocessor 305 may generate one or more error signals based upon the difference between the angular measurements of the motors 200, 202 or the periods of transitions sensed by the sensor and the desired values programmed in the microprocessor 305 (e.g., exert positional control). In this manner, the combination of the microprocessor 305, the motors 200, 202, and the encoder 250/magnet 212 may form an adaptive feedback and control loop to control overall operation of the motors 200, 202 using the output of the magnet 212 or encoder 250, depending on the embodiment in question.

Figure 8:
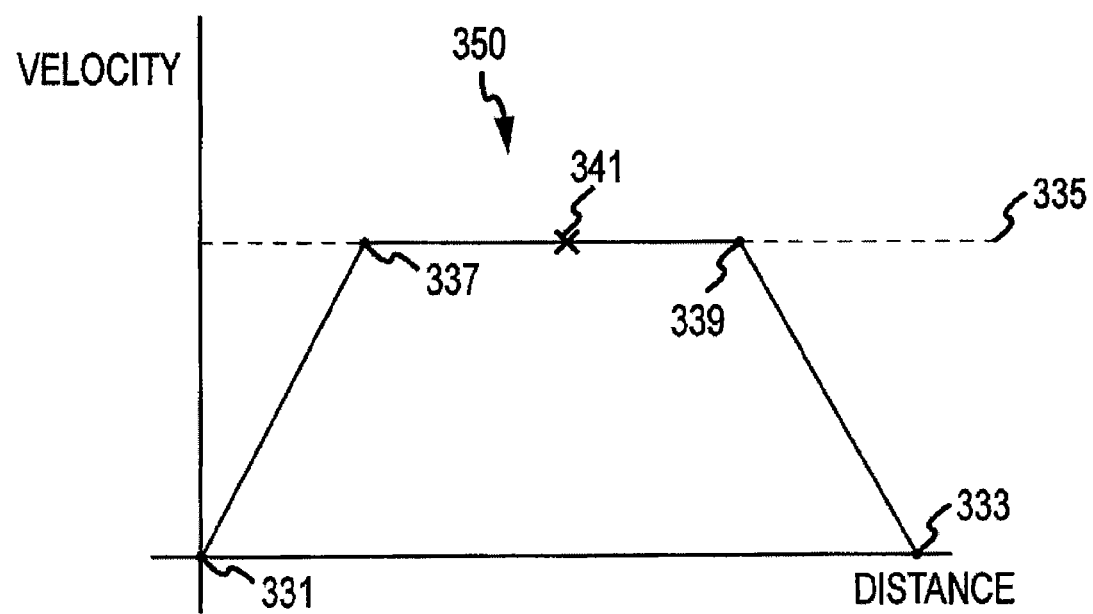
FIG. 8 is an exemplary velocity characteristic that may be obtained by operating a window covering.

In particular, FIG. 8, with reference to FIG. 7, displays an exemplary operating curve 350 when raising or lowering a shade 106 for certain embodiments. The operating curve 350 is shown on a graph having velocity as the Y-axis and distance as the X-axis. Here, both velocity and distance are expressed with respect to the shade 106 (e.g., the velocity and distance traveled of the shade). Initially, as the motors 200, 202 extend or raise the shade in the manner described above, the shade's velocity varies with the distance traveled (e.g., the shade accelerates). At a first equilibrium point 337, the velocity of the shade is held constant as the shade continues to travel. At a second equilibrium point 339, the embodiment senses via the sensor 252 that the shade is nearing an endpoint of its travel. Accordingly, the motors decelerate the shade such that its velocity returns from a constant value to zero across a certain distance. Thus, at the end point 333, the shade's travel is complete and its velocity is zero. The first and second equilibrium points 337, 339 thus define the beginning and end of the constant velocity portion of the operating curve 350, which is the section where the shade's velocity is in equilibrium.

In some embodiments, the window covering's velocity between the starting point 331 and the ending point 333 may be non-uniform. For example, in the exemplary operating curve 350, the architectural window covering 100 may slightly accelerate or slightly decelerate during the otherwise constant velocity segment of the curve 350 to maintain an overall constant velocity and, for example, to correct for error or jitter in the travel of the shade.

In some embodiments, the acceleration and deceleration portions of the operating curve 350 may be accomplished in whole, or in part, by one of the motors 200, 202.

Between the equilibrium points 337, 339, the motors 200, 202 may operate at a predetermined velocity 335. The predetermined velocity 335 may be preprogrammed during manufacture of the architectural window covering 100, or alternatively, may be programmed by the user after installation.

It should be noted that various operating curves may be employed. For example, the operating curve may be exponentially increasing instead of linearly increasing between points 331 and 337. Furthermore, in some embodiments, the architectural window covering 100 may include a tensioning sensor to determine when the architectural window covering 100 reaches the top or the bottom of the window opening and the operating curve may be modified accordingly. For example, the operating curve may be saw tooth shaped so that the architectural window covering may descend at a constant velocity for a short distance and then stop to determine the tension in the cords 320 and adjust operation accordingly.

During non-operation, the architectural window covering 100 may be in a powered off state, for example, because the desired window position has been achieved and no further adjustments in position are desired by the user. When the user desires to move the architectural window covering 100 after being powered down, the control circuit 254 may power itself up and determine the position of the architectural window covering prior to power down. Then, upon power up, the microprocessor 305 may use this last known position of the architectural window covering to move the architectural window covering 100 to the user's new desired position according to the operating curve 350 and/or last known position of the covering 100. For example, the user may set the architectural window covering 100 to be midway between the first and second intermediate points, at a third intermediate point 341, and then leave the architectural window covering 100 in that position for an extended period of time. After a predetermined period of time (which may be programmed by the user into the microprocessor 305) the control circuit 254 may enter a low power mode or power off completely to conserve power, and while doing so, may save the position of the architectural window covering 100 prior to power down. In this example, the last position prior to power off is the intermediate point 341. When the user later wants to readjust the position of the architectural window covering 100, the control circuit 254 may power back up, determine that the last position of the architectural window covering 100 was the third intermediate point 341, and then move the architectural window covering according to the operating curve starting at the third intermediate point 341.

Referring again to FIG. 7, the control circuit also may include one or more optional (as indicated by the dashed boxes) interface and protection circuits 315A-B. The protection circuits 315A-B may filter the microprocessor 305 and the other circuitry within the control circuit 254 from external electromagnetic interference (EMI) and electrostatic discharge (ESD). In addition, the protection circuits 315A-B also may filter out internal EMI/ESD from signals coming from the control circuit 254 to ensure that the control circuit 254 complies with FCC requirements.

The protection and interface circuit 315A may include one or more manual user inputs or switches to control the position of the architectural window covering 100 in the window. In some embodiments, this may include single-pole-single-throw type switches that are located at a geographically different location than the architectural window covering 100 or the control circuit 254. In other embodiments, this may include a single-pole-double-throw type switch that is located at a geographically different location than the architectural window covering 100 or the control circuit 254. The user may program the control circuit 254 using the protection and interface circuit 315A by actuating the switch to the up, down, and/or neutral positions.

The protection and interface circuit 315B may include a bidirectional data interface such as an RQ™ type interface standard from Electronic Solutions, Inc. of Lafayette, Colo. The RQ™ type interface is a six conductor bidirectional full-duplex data interface. Alternative embodiments may use the unidirectional RP type data communication protocol that provides simplex communication. In still other embodiments, the protection and interface circuit 315B may include a bidirectional data protocol or communication interface, such as the Z-wave™ interface from Zensys. Implementing Z-Wave™ allows low power consumption, 2-way RF, mesh networking technology and battery-to-battery support. During operation, Z-Wave™ mesh networking technology routes 2-way command signals from one Z-Wave™ device to another around obstacles or radio dead spots that might occur. Additional interface types may include CAN, LON, and Zigbee to name but a few.

Regardless of the type of bidirectional data interface used, the interface may allow the microprocessor 305 to be queried as to the present status of the architectural window covering 100. For example, in some embodiments the architectural window covering 100 is configured with a graphic on it so as to display a message or logo. The message or logo may be displayed as the architectural window covering 100 rotates its shades back and forth, which may be a function of the position of the drive shaft 203. Thus, the interface may be used to remotely control the message or logo displayed on the shades of the architectural window covering 100 by allowing the user to query the position of the roller 122.

In addition, a plurality of window coverings may be linked together via an interface and user commands may be echoed between window coverings within the plurality. For example, all of the window coverings on the East side of a building may be linked together via the interface and a user standing at one end of the building and desiring to operate all the window coverings in unison may provide the desired command to the architectural window covering the user happens to be standing by and have the desired command echoed to all window coverings on that same interface.

The architectural window covering 100 may include the power circuitry 270. As shown in FIG. 7, the power circuitry 270 may provide power to the bridge 310, the protection circuits 315A-B, the microcontroller 305, the one or more switches 242, and or the one or more angular sensors 250. The power circuitry 270 may receive a 12-24 volt DC input power and provide various output voltage levels. For example, the interface and protection circuit 315B may operate at 10 volts while the microcontroller 305 may operate at 5 volts. The power circuitry 270 is capable of supplying power at both these levels as well as many others. In some embodiments, the protection circuit 315A may receive its power via the microcontroller 305. In alternative embodiments, the input power may range from 12 to 40 volts DC.

The power circuitry 270 may provide a power fail detection line to the microprocessor 305. In the event that the power circuitry 270 detects that the main power supplied to the power circuitry 270 has been turned off, then it may warn the microcontroller 305 this has occurred via the power fail detection line shown. The power circuitry 270 also may include the ability to implement an efficient power down scheme. In order to give the power circuitry 270 sufficient hold-up time for the microcontroller to execute a power down sequence, the power circuitry 270 may include a capacitor that stores enough charge to power the microcontroller while it executes the power down scheme. In some embodiments, this scheme includes determining that power is going away, for example, by the microcontroller determining that the power main has been shut off. As a result, the microprocessor 305 may stop the two or more motors 200, 202, monitor the deceleration of the encoder 250, and save the state of the encoder 250 for use when the architectural window covering is powered back on.

The above discussion is meant to be illustrative of the principles and various embodiments of the present invention. Numerous variations and modifications will become apparent once the above disclosure is fully appreciated. For example, the programmable motor arrangement may find application in a variety of settings outside the context of architectural window coverings such as in garage door openers or with retractable projection screens. The claims should be interpreted to include any and all such variations and modifications. In addition, the above description has broad application, and the discussion of any embodiment is meant only to be exemplary, and is not intended to intimate that the scope of the disclosure, including the claims, is limited to these embodiments.

The invention claimed is:

1. An architectural window covering, comprising:
   a shade;
   a roller defining a bore coupled to the shade;
   at least two motors axially aligned and electrically coupled in parallel and positioned at least partially in said bore and rotatably coupled to the roller;
   an elongated motor housing defining a cavity; and
   wherein said at least two motors are positioned at least partially in said cavity of said motor housing, which is positioned at least partially in said bore and being rotatable relative to said roller.

2. The architectural window covering of claim 1, wherein the at least two motors each have a motor drive shaft and are physically coupled by a flexible connector that connects the motor drive shafts.

3. The architectural window covering of claim 2, wherein:
   at least one of said two motors is positioned adjacent an end of said motor housing and is operably associated with an output shaft extending from said end of said motor housing; and
   said output shaft operably engaging said roller to drive said roller relative to said motor housing.

4. The architectural window covering of claim 1, further comprising:
   one or more light emitting diodes situated within the roller;
   a light pipe member associated with each light emitting diode to transmit any light from said light emitting diode to a location visible to the user.

5. The architectural window covering of claim 4, further comprising:
   a switch positioned in the bore of the roller; and
   wherein at least one light pipe member is configured to be selectively and operably engaged with the switch.

6. The architectural window covering of claim 4, wherein the at least one light pipe member is made of lexan.

7. The architectural window covering of claim 1, further comprising damper material placed between at least one of said motors and a motor housing.

8. An architectural window covering as defined in claim 1, wherein:
   a dampening member is positioned between at least one of said two motors and the motor housing to dampen the movement of the motor from the motor housing.

9. An architectural window covering as defined in claim 8, wherein:

at least one of the two motors is rotationally anchored to said motor housing by at least one tang, and the dampening member is positioned between the at least one tang and the motor housing.

10. An architectural window covering as defined in claim 8, wherein said dampening member radially centrally locates the at least one motor in the housing.

11. An architectural window covering, comprising:
a shade;
a roller defining a bore coupled to the shade; and
at least two motors axially aligned and electrically coupled in parallel and positioned at least partially in said bore and rotatably coupled to the roller;
a switch having at least one state and for at least partially controlling the operation of the roller, the switch positioned in said bore;
a light indicator positioned adjacent said switch and responsive to the state of said switch; a light pipe member positioned adjacent switch and said light indicator for receiving light emitted therefrom and transmitting the emitted light to be visible by a user, said light pipe member having portion operably engaging the switch to allow operation thereof by the user.

12. An architectural window covering as defined in claim 11, wherein:
said light pipe member includes a user engagement end, a light receiving end, and a switch engagement end; and
wherein said light receiving end is adjacent the light indicator, said light switch engagement end is positioned adjacent the switch, and the user engagement end is positioned to be accessible to the user.

13. An architectural window covering as defined in claim 12, wherein:
said light received by the light receiving end is transmitted through the light pipe member to the user engagement end and is visible therethrough by the user.

14. An architectural window covering as defined in claim 13, wherein:
said light pipe is pivotally mounted in the bore.

15. An architectural window covering, comprising:
a shade;
a roller defining a bore coupled to the shade;
at least two motors axially aligned and electrically coupled in parallel and positioned at least partially in the bore and rotatably coupled to the roller;
one or more light emitting diodes situated within the roller; and
a light pipe member associated with each light emitting diode to transmit any light from the light emitting diode to a location visible to the user.

16. The architectural window covering of claim 15, further comprising:
a switch positioned in the bore of the roller; and
wherein at least one light pipe member is configured to be selectively and operably engaged with the switch.

17. The architectural window covering of claim 15, wherein the at least one light pipe member is made of lexan.

18. The architectural window covering of claim 15, further comprising:
an elongated motor housing defining a cavity; wherein
the at least two motors are positioned at least partially in the cavity of the motor housing, which is positioned at least partially in the bore and rotatable relative to the roller; and
a dampening member is positioned between at least one of the at least two motors and the motor housing to dampen the movement of the motor from the motor housing.

19. The architectural window covering of claim 18, wherein:
at least one of the at least two motors is rotationally anchored to the motor housing by at least one tang, and the dampening member is positioned between the at least one tang and the motor housing.

20. The architectural window covering of claim 18, wherein the dampening member radially centrally locates the at least one of the at least two motors in the housing.

* * * * *

UNITED STATES PATENT AND TRADEMARK OFFICE
CERTIFICATE OF CORRECTION

PATENT NO. : 8,723,454 B2  Page 1 of 1
APPLICATION NO. : 13/054359
DATED : May 13, 2014
INVENTOR(S) : Skinner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this
Twenty-ninth Day of September, 2015

Michelle K. Lee
*Director of the United States Patent and Trademark Office*